(12) United States Patent
Nabeiro et al.

(10) Patent No.: US 11,147,413 B2
(45) Date of Patent: Oct. 19, 2021

(54) BEVERAGE DISCHARGE DISPOSITION FOR FROTHING A LIQUID FOOD PRODUCT IN A BEVERAGE PREPARATION MACHINE

(71) Applicant: NOVADELTA—COMÉRCIO E INDÚSTRIA DE CAFÉS S.A., Lisbon (PT)

(72) Inventors: Rui Miguel Nabeiro, Campo Maior (PT); João André De Figueiredo Branco, Moscavide (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 297 days.

(21) Appl. No.: 16/340,787

(22) PCT Filed: Sep. 28, 2017

(86) PCT No.: PCT/PT2017/050024
§ 371 (c)(1),
(2) Date: Apr. 10, 2019

(87) PCT Pub. No.: WO2018/070892
PCT Pub. Date: Apr. 19, 2018

(65) Prior Publication Data
US 2020/0046160 A1 Feb. 13, 2020

(30) Foreign Application Priority Data
Oct. 10, 2016 (PT) .......................................... 109670

(51) Int. Cl.
*A47J 31/44* (2006.01)
*A47J 31/46* (2006.01)
(Continued)

(52) U.S. Cl.
CPC .......... *A47J 31/4485* (2013.01); *A47J 31/46* (2013.01); *A47J 31/061* (2013.01);
(Continued)

(58) Field of Classification Search
CPC ........ A47J 31/44; A47J 31/4485; A47J 31/54; A47J 31/60; A47J 31/46; A47J 31/061; A47J 31/4403; A47J 31/4482
(Continued)

(56) References Cited

U.S. PATENT DOCUMENTS 5,738,002 A * 4/1998 Marano-Ducarne ........................ A47J 31/4485
99/293

OTHER PUBLICATIONS

Written Opinion for PCT/PT2017/050024, dated Jan. 29, 2018.
International Search Report for PCT/PT2017/050024, dated Jan. 29, 2018.

* cited by examiner

*Primary Examiner* — Phuong T Nguyen
(74) *Attorney, Agent, or Firm* — Sughrue Mion, PLLC

(57) ABSTRACT

A beverage discharge disposition for frothing a liquid food product such as milk and comprising a discharge casing (1) configured for provision in the front region of a beverage preparation machine (20). The beverage discharge disposition comprises an air valve (10) adapted to provide better milk frothing conditions and including an ambient air admission, an air flow constrain element (19) adapted to provide variations of a passageway section (18) of ambient air flow, an air flux discharge wall (17) provided downstream of the air flow constrain element (19), and a discharge chamber provided upstream of the air flux discharge wall (17).

15 Claims, 5 Drawing Sheets

(51) Int. Cl.
 *A47J 31/06* (2006.01)
 *A47J 31/60* (2006.01)
(52) U.S. Cl.
 CPC ........ *A47J 31/4403* (2013.01); *A47J 31/4482* (2013.01); *A47J 31/60* (2013.01)
(58) Field of Classification Search
 USPC .......... 99/279, 287, 290, 293, 294, 295, 300
 See application file for complete search history.

BEVERAGE DISCHARGE DISPOSITION FOR FROTHING A LIQUID FOOD PRODUCT IN A BEVERAGE PREPARATION MACHINE

This Application is a National Stage of International Application No. PCT/PT2017/050024 filed Sep. 28, 2017, claiming priority based on Portuguese Patent Application No. 109670 filed Oct. 10, 2016.

FIELD OF THE INVENTION

The present invention refers to the field of the beverage discharge dispositions comprising an air valve for propelling frothed milk.

The present invention further refers to a beverage preparation machine by means of brewing of a respective substance, in particular aromatic beverages, in general, and comprising a beverage discharge disposition.

BACKGROUND OF THE INVENTION

The prior art presents several solutions of beverage preparation machines with a first beverage discharge, for example espresso type coffee, and a second beverage discharge, for example milk, whereby said second beverage discharge is provided from a connection to an exterior recipient, in particular to an exterior milk recipient and adapted so that a flow is sucked from said exterior recipient by means of a pressurized flow flowing through said first discharge.

Document EP 1746920 B1 discloses a beverage preparation system of the type of the present invention, comprising a beverage preparation machine and a milk supply recipient, whereby the machine presents a discharge disposition comprising a first vapour discharge line and a second milk discharge line, whereby said second line is provided in connection with said milk supply recipient.

Documents EP 1785074 B1 and EP 2275010 B1 disclose discharge dispositions of the same type and comprising electronic means for flow regulation by means of a machine control unit.

Document EP 0813834 B1 discloses a discharge disposition comprising mechanical means of flow regulation. Said mechanic means present several advantages in terms of simplicity and reliability.

Document EP 2189085 B1 discloses a frothing unit that can be removed as a unit, so that can be cleaned separately.

Document WO 2013/128323 A1 discloses a beverage preparation machine that presents a discharge disposition of the type of the present invention.

The regulation of the discharge flow of frothed food product, as well as the cleaning of the parts that contact with it, are two important problems in this type of discharge disposition.

None of the documents in prior art discloses a solution, based upon the mixture of water vapour and milk flows propelled by an upstream air flow, that provides a discharge flow through the air valve in conditions favourable for frothing of the mixture of water vapour and milk flows.

GENERAL DESCRIPTION OF THE INVENTION

The objective of the present invention is to provide a beverage discharge disposition adapted for frothing of a liquid food product, in particular milk, and for discharge thereof and of another beverage, in particular of aromatic beverages such as for example espresso type coffee, adapted so as to provide an optimized discharge of air flow.

This objective is attained according with the present invention by means of a beverage discharge disposition according to claim 1.

In particular, said beverage discharge disposition comprises a milk circulation disposition including an air valve disposition that presents a compact and simple construction, including an air admission adapted so as to vary the air flow that is mixed downstream with the water vapour and milk flows, by means of actuation of milk flux selection means.

Said air discharge wall presents a characteristic dimension of air discharge passageway that has been demonstrated in tests as particularly favourable to obtain better texture and consistency of frothed milk in the cup, and is advantageously provided with a general disk-like form so that can be retained by pressured-fitting together with a sealing element arranged adjacent downstream thereof.

Said air valve disposition is further provided so that can be attached in removable manner, by means of pressured-fitting, in flow connection with said milk circulation disposition, so that can be manually removed from an attached part of said discharge casing, notably so as to enable cleaning thereof, and again placed in position thereon.

A related objective of the present invention is to provide a beverage preparation machine, in particular of aromatic beverages such as for example espresso type coffee, comprising a brewing device adapted for collecting a portion of edible substance, optionally provided inside of a capsule, and a beverage discharge disposition that provides better frothing results.

This objective is attained by means of a machine according to claim 15.

DESCRIPTION OF THE FIGURES

The invention shall hereinafter be explained in greater detail based upon preferred embodiments and in the attached Figures.

The Figures show, in simplified schematic representations:

FIG. 1 represents a machine (20) for preparing beverages, including aromatic beverages, from an edible substance, such as for example espresso coffee, tea and similar, as well as a liquid food product that can be frothed, in particular milk.

The machine (20) is adapted for flow connection from a respective beverage discharge connection, said disposition including a discharge casing (1) that corresponds to the piece provided on the front region of said machine (20), and that provides discharge of at least two types of beverages into a recipient underneath thereof.

Said discharge casing (1) presents selection means (5) of beverage type on a front region above of said beverage discharge, and presents flow connection means provided so that can be removed, with a milk recipient (6) disposed outside of said machine (20).

Moreover, in particular, said machine (20) presents a preferred embodiment of a beverage discharge disposition according to the present invention, that comprises a discharge casing (1) of beverage discharge configured so that can be provided in the front region of said beverage preparation machine (20) and that provides a more ergonomic use, both in terms of selection of type of milk flow, as in terms of easy mounting and dismounting of the parts in contact with milk for periodic cleaning thereof, as shall be described in greater detail hereinafter.

Figure 1:
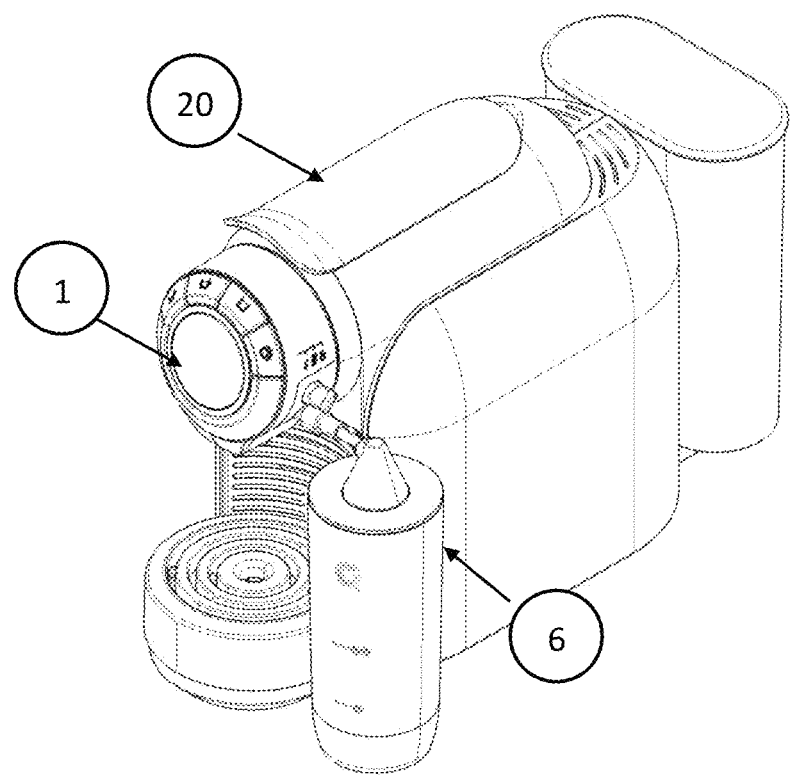
FIG. 1: perspective view of a beverage preparation machine presenting a preferred embodiment of beverage discharge disposition according to the present invention.
Figure 2:
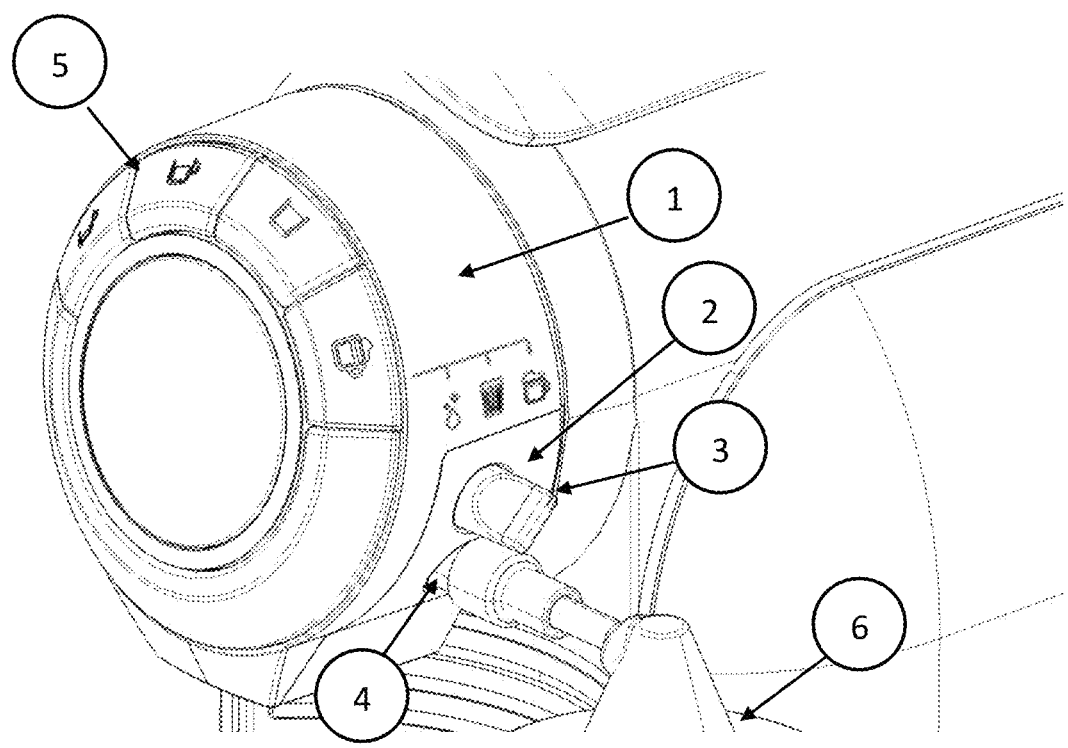
FIG. 2: detail view of preferred embodiment of the beverage discharge disposition according to FIG. 1.

As represented in FIG. 2, according to an inventive aspect, said discharge casing (1) comprises a milk circulation disposition (2) that presents selection means (3) of milk flux.

In particular, according to an inventive aspect, said selection means (3) of milk flux and said selection means (5) of beverage type are provided in different regions and planes of said discharge casing (1), whereby said selection means (3) of milk flux are preferentially provided on a lateral region of said discharge casing (1), and said selection means (5) of beverage type are provided on a front region of said discharge casing (1).

Moreover, it is preferred when said selection means (3) of milk flux are disposed on a region of said milk circulation disposition (2) next to and above of flow connection means, for example in a tube form, of said milk circulation disposition (2) to said milk supply recipient (6).

It is herewith advantageously provided a compact and ergonomic disposition of the main components associated with the regulation by the user of the type of milk flow and the milk supply from an exterior recipient.

It is further preferred that said selection means (3) of milk flux are adapted so that said milk flux selection means (3) are provided so that can be manually actuated between successive positions along an actuation plane that is at least approximately orthogonal relative to the front plane of said discharge casing (1).

It is preferred when said milk flux selection means (3) are adapted so that provide a regulation of air flow, in particular by means of said air valve disposition (10), in the interior of said milk circulation disposition (2) and therewith of the type of milk flow discharged downstream.

Advantageously in terms of usage, said selection means (3) of milk flux are provided so that can be moved along a previously defined path, preferentially around a respective rotation axis, between a plurality of at least two and up to five, preferentially up to three previously defined positions, thereby providing a corresponding variation of the type of discharge flow of said liquid food product to be frothed, whereby at least one position corresponds to a substantially continuous milk flow type and a second position corresponds to a substantially frothed milk flow type.

It is preferred when said milk flux selection means (3) are configured as a rotation button-like element, with side surfaces adapted for placing two opposing fingers so as to drive a rotation thereof.

It is further preferred when said milk flux selection means (3) are provided so that can be moved frontwards and backwards along said path, preferentially along at least one of:

a linear extension, whereby said extension presents a dimension comprised between 1 and 4 cm, preferentially between 2 and 3 cm;

an angular extension, whereby said angular extension corresponds to an angle bigger than 5° and smaller than 120°, preferentially bigger than 10° and smaller than 90°.

It is further preferred when there are provided graphic and/or acoustic signals associated with each one of said previously defined positions of said milk flux selection means (3), so that the user can recognize with type of flux is selected at each any given moment.

As further represented in FIG. 2, according to another preferred embodiment, said milk flux selection means (3) are provided on a lateral face of said discharge casing (1), whereas said beverage type selection means (5) are provided on a front face of said discharge casing (1).

Figure 3:
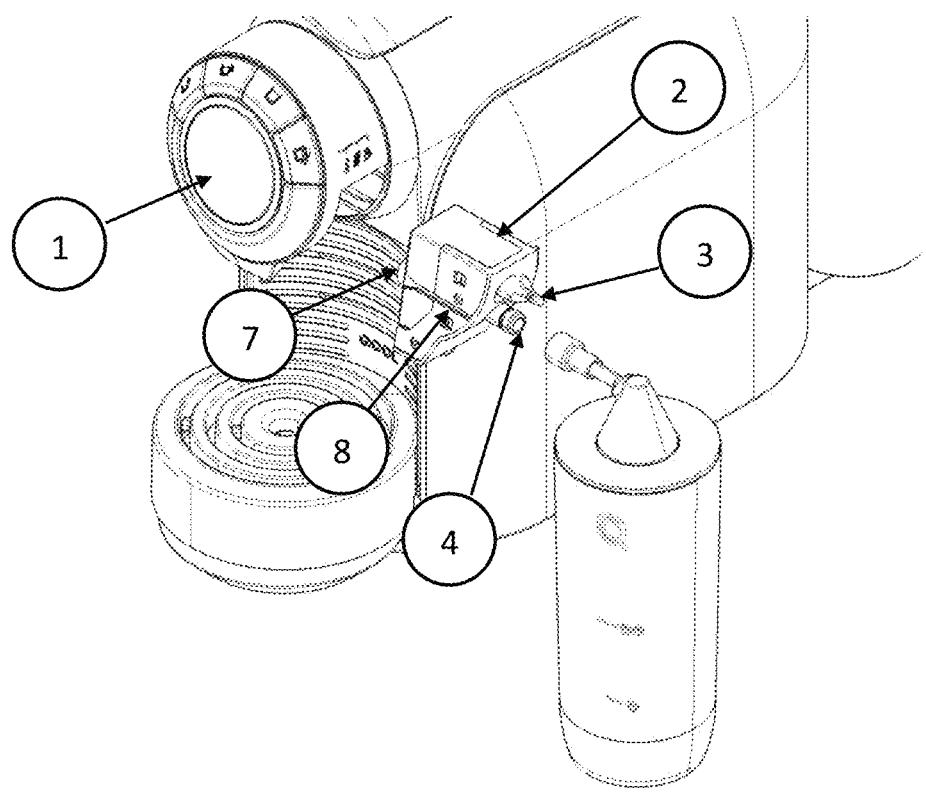
FIG. 3: exploded perspective view of the preferred embodiment of the beverage discharge disposition according to FIG. 1.

As one can better observe in FIG. 3, said discharge casing (1) presents a milk circulation disposition (2) that comprises milk flux selection means (3), a milk entry connection (4) adapted so that provides connection to said milk recipient (6), and a vapour entry connection (7) adapted for flow connection to water vapour supply means, beverage type selection means (5) provided on a different region from said milk circulation disposition (2) and presenting at least one option relative to the use of said liquid food product to be frothed, in particular, milk.

According to an inventive aspect, said discharge casing (1) presents a first part provided attached to the casing of said beverage preparation machine (20), and said milk circulation disposition (2) is provided so that can be manually mounted and dismounted on said attached part of discharge casing (1), thereby providing a removable attachment of all components that are in direct contact with milk to the remanding discharge casing (1), and removable flow connection of said vapour exit nozzle (13) with said second beverage discharge (12).

As shall be promptly understood, it is herewith advantageously provided the possibility of the user to remove all components that are exposed in direct contact with milk, provided in a particularly compact form, as a single joint arrangement, manually removable from the remanding discharge casing, so that enables its periodic cleaning in simple and rapid manner, as well as its placement in expedite and reliable manner.

According to a preferred embodiment, said milk circulation disposition (2) presents a plurality of components placed and removed as a single element, preferentially by means of pressured-fitting, in said attached part of discharge casing (1).

Moreover, it is preferred when said milk circulation disposition (2) is generally provided with a shape and dimension corresponding to a part that is similar or smaller than half the form and general dimension of said discharge casing (1) and that can be fitted on a lateral region of said attached part of the discharge casing (1).

It is preferred when said milk circulation disposition (2) is adapted so that can be placed onto, and removed from, a lateral portion of said attached part of discharge casing (1), by means of displacement in transversal manner relative thereto, preferentially by guiding means (8) provided in opposite regions, for example in lateral regions, and developing along at least part of the extension of said opposing regions of said milk circulation disposition (2), thereby providing establishing, and removal, of flow connection of said vapour entry connection (7) with said vapour exit nozzle (13) provided on said attached part of discharge casing (1).

It is herewith provided the possibility of an easy disassembling and assembling of the milk circulation disposition (2) for the purpose of cleaning, as a single piece. In particular, said milk circulation disposition (2) is adapted so that can be placed for cleaning in a convention dish washing machine.

It is preferred when said vapour exit nozzle (13) is adapted for pressurized-fitting with a vapour entry connection (7) associated with the flow distribution disposition (11).

It is further preferred when said connection to the milk supply recipient (6) includes a milk entry connection (4) adapted for pressurized-fitting between a connection part of milk supply recipient (6) and a connection part of said discharge casing (1).

Moreover, it is preferred when said milk entry connection (4) is provided in flow connection with said milk supply recipient (6) by means of a connection that includes at least one location with possibility of rotation in several planes, preferentially including a spherical kneecap-like point, preferentially including a flexible tube (16) provided for sucking milk from said milk supply recipient (6).

Figure 4:
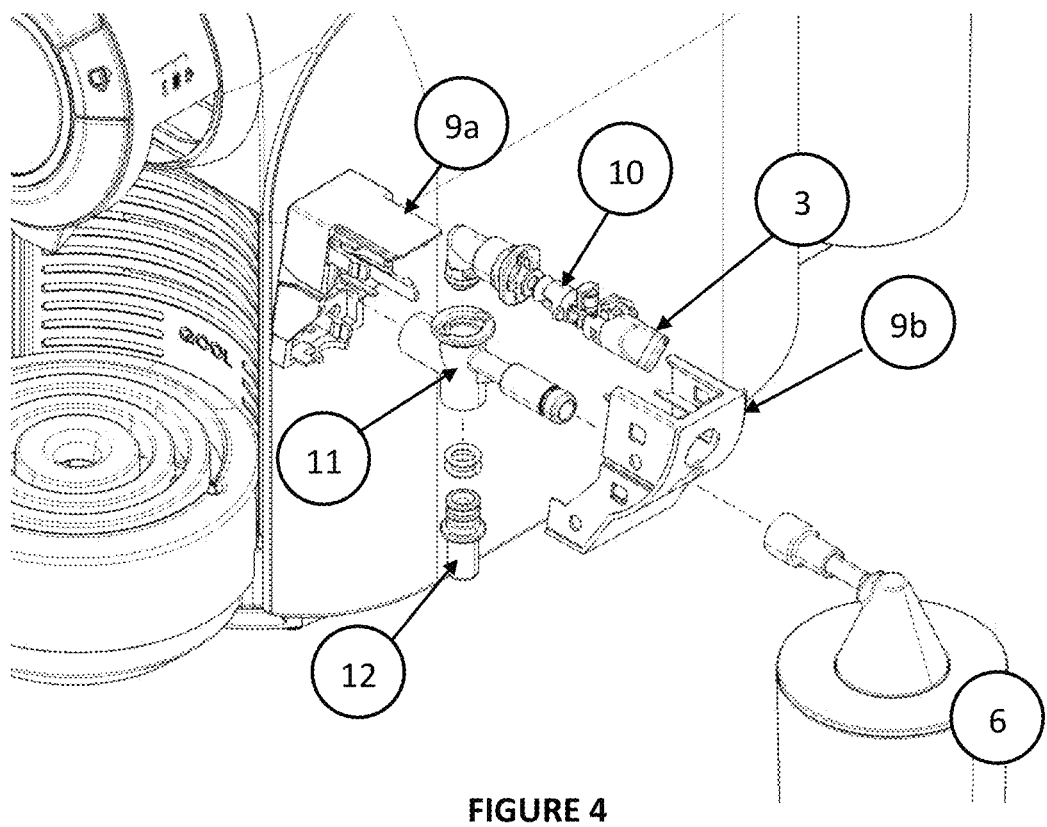
FIG. 4: exploded perspective view of the preferred embodiment of the beverage discharge disposition according to FIG. 1.

According to a preferred embodiment, represented in FIG. 4, said milk circulation disposition (2) presents a first part (9a) adapted so as to provide support to said milk flux selection means (3) and to said milk entry connection (4), and preferentially configured so as to provide an exterior surface that develops in coherent manner in relation to the remanding exterior surface of said discharge casing (1) when said milk circulation disposition (2) is placed in said discharge casing (1), and further presents a second part (9b) adapted so as to provide support to said vapour entry connection (7), whereby said first and second structural parts (9a, 9b) are configured as elements that can be manually pressure-fitted with each other.

It is further preferred when said first and second structural parts (9a, 9b) are adapted so that support an air valve disposition (10), a flow distribution disposition (11) and a milk discharge (12), along a general upstream to downstream direction.

In particular, it is preferred when said milk circulation disposition (2) comprises a flow distribution disposition (11) adapted so that presents said milk entry connection (4) and said vapour entry connection (7), and that provides flow connection, preferentially by means of pressure fitting, with said air valve disposition (10), and with said second beverage discharge (12), whereby said flow distribution disposition (11) is preferentially retained in exterior walls of said first and second structural parts (9a, 9b).

Figure 5:
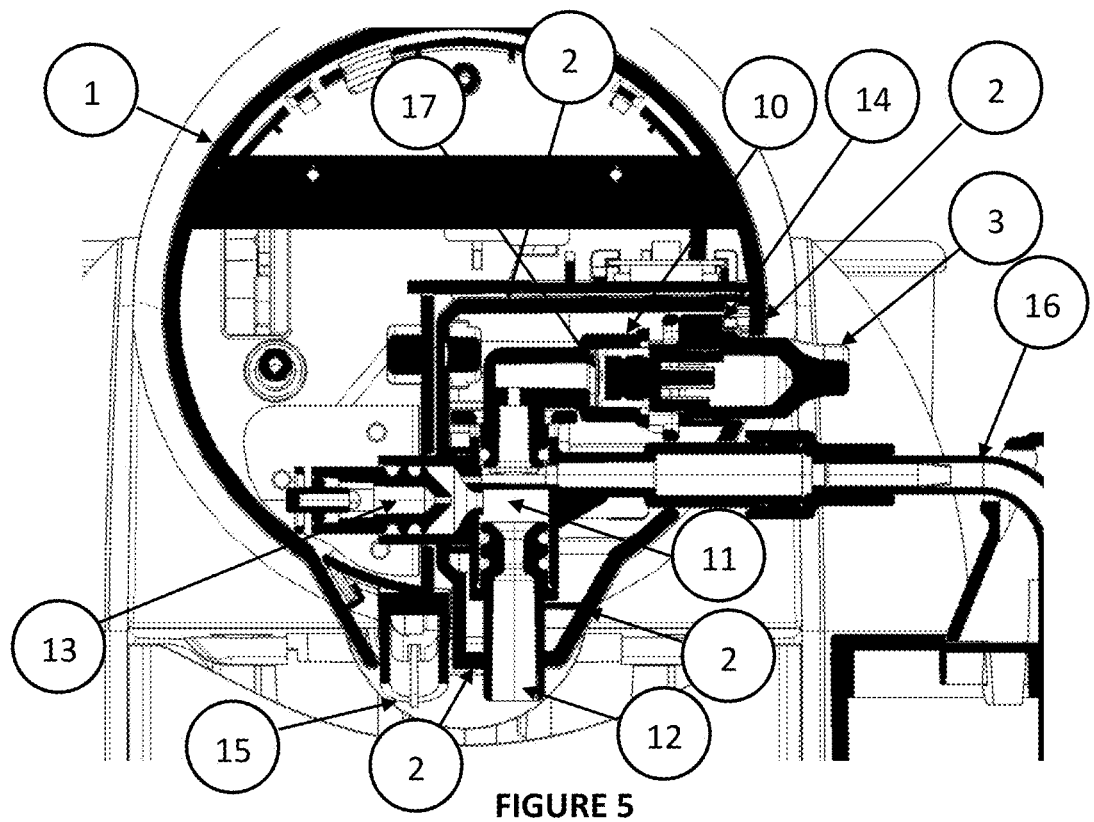
FIG. 5: cut front view of the preferred embodiment of the beverage discharge disposition according to FIG. 1.

FIG. 5 shows an exploded perspective representation of the several components comprised in said milk circulation disposition (2).

According to an inventive aspect, said discharge casing (1) comprises a first fluid discharge line adapted for discharging a first type of beverage and provided in flow connection with an upstream pressurized fluid source, such as for example a pressure pump, and downstream with a first beverage discharge (15) and a second fluid discharge line. Said second fluid discharge line that comprises:
- a first fluid supply adapted for supplying vapour and provided in flow connection upstream with said pressurized fluid source and downstream with a vapour exit nozzle (13),
- a second fluid supply adapted for supplying air and that provides flow connection upstream with an air admission (14) associated with selection means (3) of milk flux that provide regulation of the air flow through an air valve disposition (10), and downstream with a flow distribution disposition (11),
- a third fluid supply adapted for supplying milk and that provides flow connection upstream with a milk supply recipient (6) provided outside of said beverage preparation machine, and downstream with said flow distribution disposition (11).

According to a preferred embodiment, said first, second and third fluid supplies, are provided in flow connection downstream, by means of said flow distribution disposition (11), with a second beverage discharge (12).

It is further preferred when said second and third fluid supplies and respective second fluid discharge (12) are provided so that can be flow connected by means of removable pressure-fitting connection of said flow distribution disposition (11) with said vapour entry connection (7), so that said second and third fluid supplies, flow distribution disposition (11) and second beverage discharge (12) can be jointly removed from connection with said first fluid supply.

Figure 6:
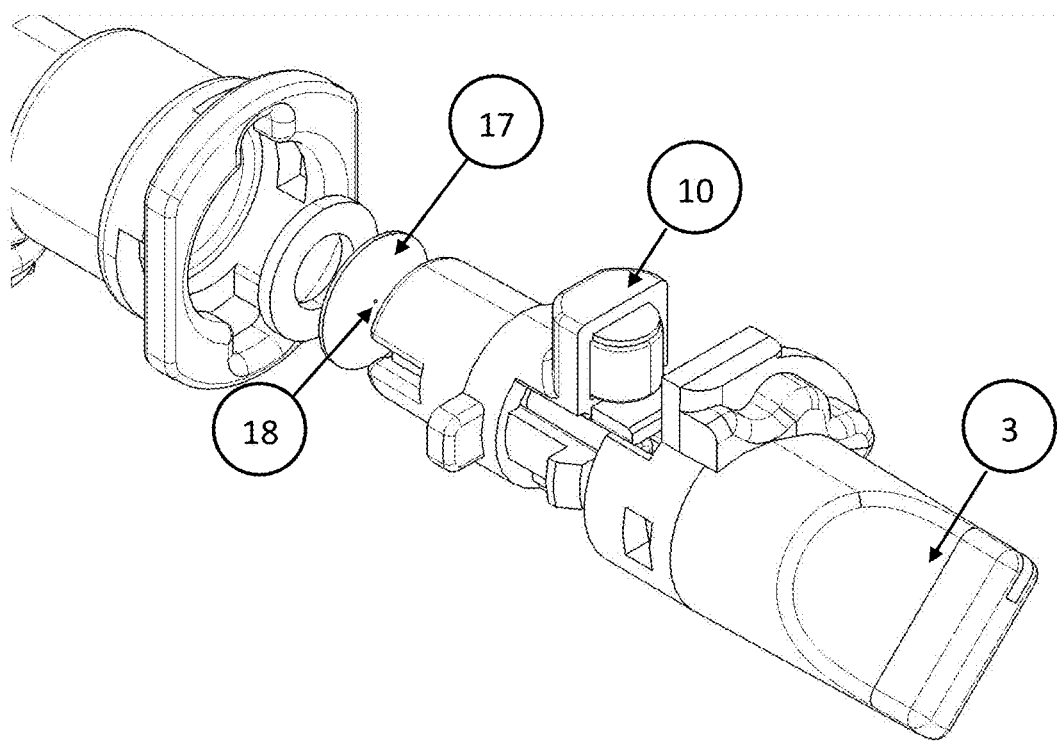
FIG. 6: exploded perspective view of the air valve in the preferred embodiment of the beverage discharge disposition according to FIG. 1.

FIG. 6 represents a detail of said air admission disposition, provided inside of said milk circulation disposition (2).

Figure 7:
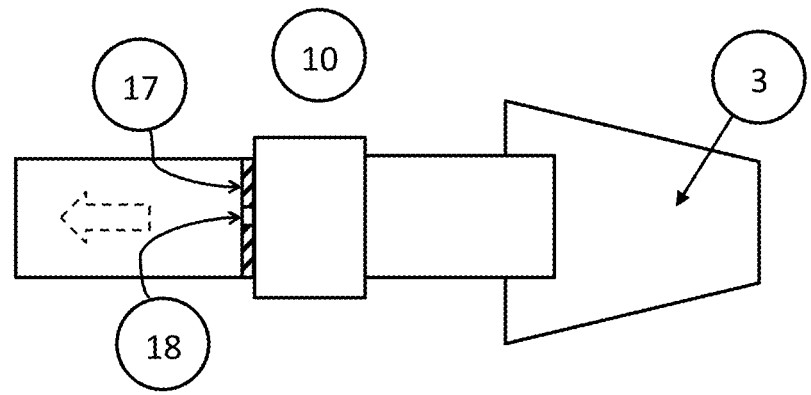
FIG. 7: side cut view of a preferred embodiment of air valve included in a disposition according to the present invention.
Figure 8:
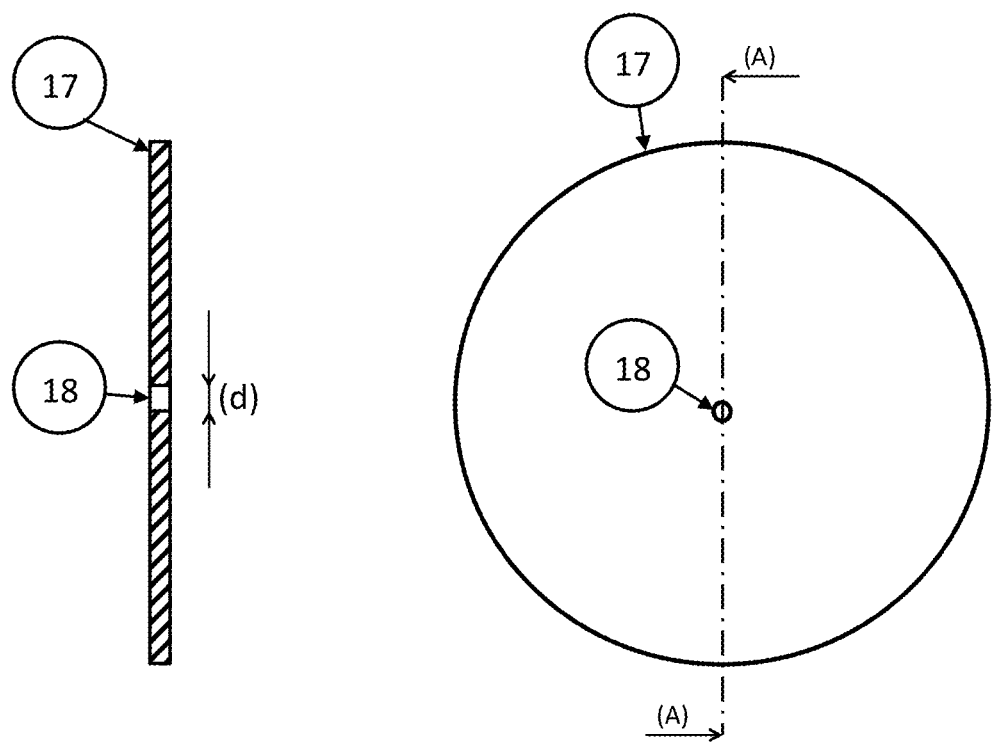
FIG. 8: side cut view and front view of a discharge wall in air valve included in a disposition according to the present invention.

As represented, and also in FIGS. 7 and 8, according to an inventive aspect, said air valve disposition (10) comprises a discharge wall (17) that presents a single flow passageway (18) with a characteristic passageway dimension (d), for example diameter, that is at least one order of magnitude smaller than a characteristic dimension of the space downstream thereof.

It is preferred when said air flux discharge wall (17) is provided in the form of a metallic disc, with a thickness smaller than 3 mm, preferentially smaller than 1.5 mm, preferentially in a food-grade metallic alloy. It is further preferred when said discharge wall (17) presents a single flow passageway (18) with a characteristic passageway dimension (d) comprised between 0.18 and 0.30 mm, preferentially between 0.20 and 0.24 mm. this characteristic dimension revealed itself as particularly advantageous in terms of frothed milk flow.

Figure 9:
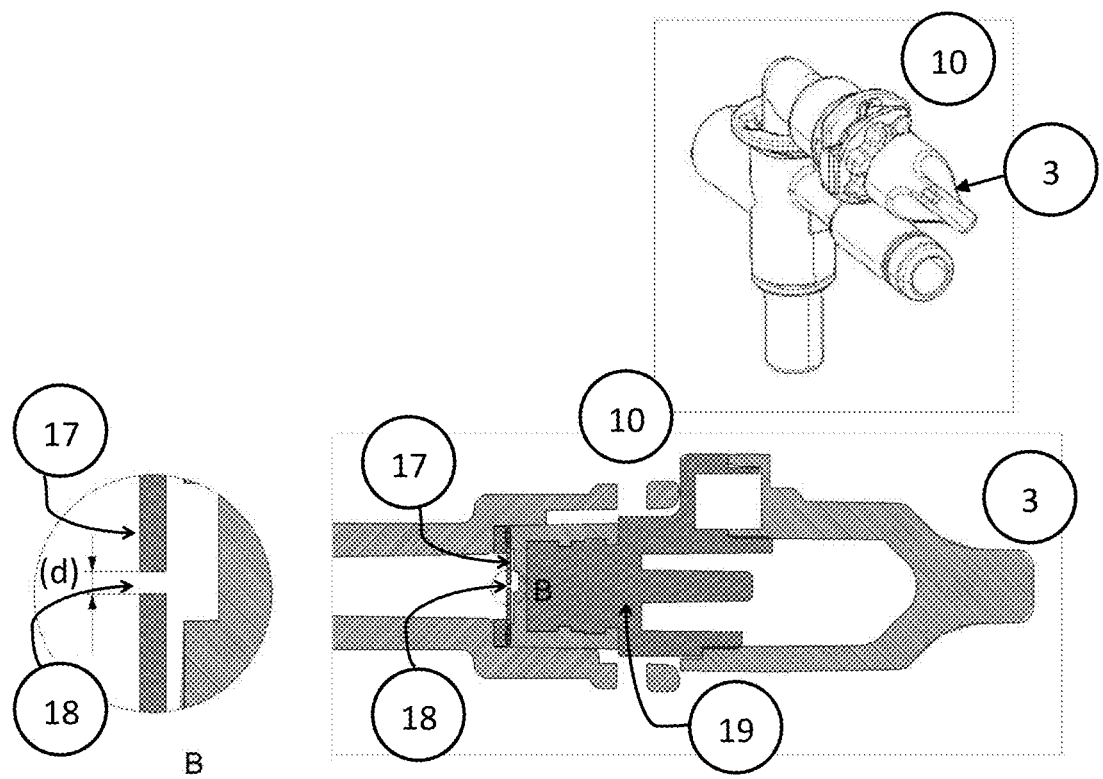
FIG. 9: perspective and side cut views of air valve included in a disposition according to the present invention, when said air valve (10) is in a closed position.
Figure 10:
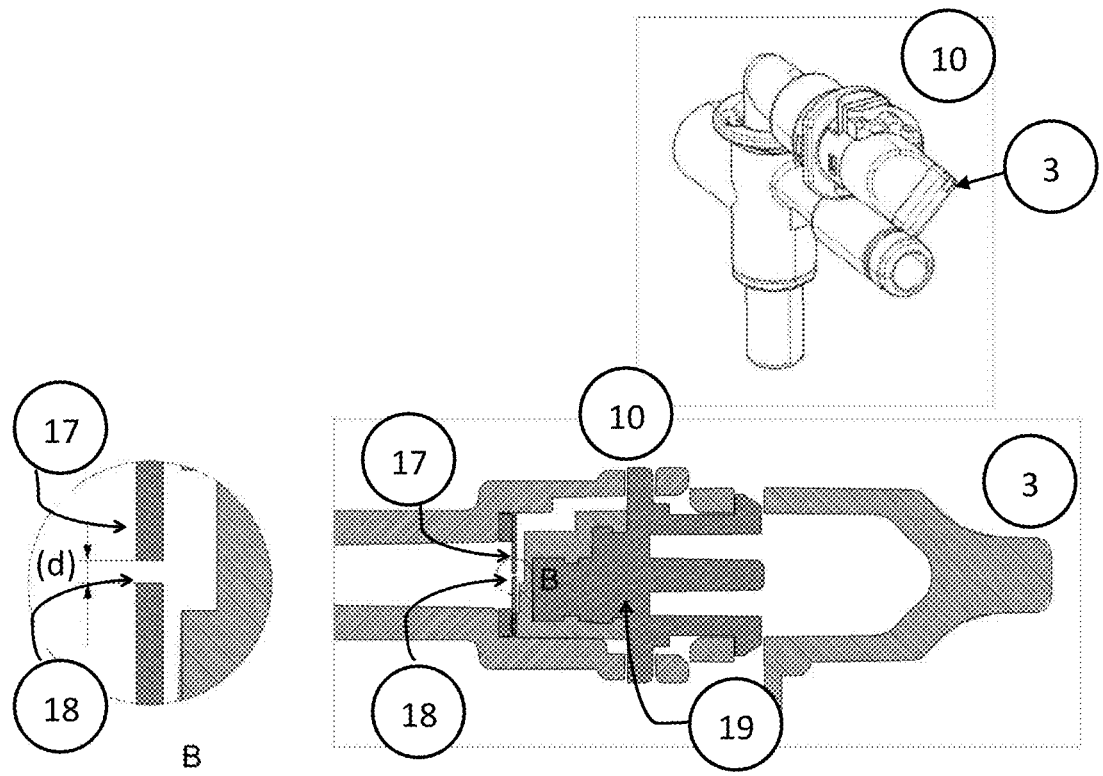
FIG. 10: perspective and side cut views of air valve included in a disposition according to the present invention, when said air valve (10) is in an open position.

As can be better observe in FIG. 9, where the air valve disposition (10) is closed, and in FIG. 10, where it is open, said air valve disposition (10) comprises an ambient air admission, an air flow constrain element (19) adapted so as to provide variations of passageway section for ambient air flow, an air flux discharge wall (17) provided downstream of said air flow constrain element (19) and a discharge chamber provided downstream of said air flux discharge wall (17).

According to a preferred embodiment, said air flux discharge wall (17) is provided inside of said air valve disposition (10) so as to interact with said upstream flow passageway section constrain element (19) that is actuated by said milk flux selection means (3), whereby said flow constrain element (19) is adapted so that provides at least three different flow section passageways along respective angular segments of the perimeter thereof, corresponding to different previously defined positions of said milk flux selection means (3), thereby providing at least three different passageway sections of air flow entry on said air valve disposition (10), whereby said flow constrain element (19) is further preferentially adapted so that, when said air valve disposition (10) is at least partially open, the entry air flow impinges said air flux discharge wall (17) mostly on a top half thereof.

It is preferred when said air flux discharge wall (17) is adapted so that can be retained by means of pressured-fitting inside of a disposition with a general tubular form that presents a degree along the interior perimeter whereupon successively sit a sealing with a general disk-like form and a perimeter region of said air flux discharge wall (17), preferentially by means of removable fitting, so that said air flux discharge wall (17) can be manually removed from said air valve disposition (10), and again mounted thereupon, without the need of using tools.

It is further preferred when said air valve disposition (10) is provided in mechanic actuation connection upstream with said milk flux selection means (3), preferentially by means of said flow constrain element (19) arranged on the same rotation axis and adapted so that engages directly, preferentially by means of a removable fitting connection, with said milk flux selection means (3).

According to another preferred embodiment, said air valve disposition (10) is provided flow connected downstream, preferentially by means of an elbow connection, with a flow distribution disposition (11) that provides flow connection to a milk flow and to a pressurized vapour flow.

This general configuration of the air valve disposition (10) and respective air flux discharge wall (17) advantageously provides a more reliable construction in terms of different types of milk flows downstream, including frothed flow, as well as a more compact construction, of easy disassembling and assembling for cleaning of its component parts.

As one can further observe in the perspective representations, the air valve disposition (10) is provided flow connected downstream, preferentially by means of an elbow connection, with said flow distribution disposition (11). The milk flux selection means (3) are provided in actuation connection on the same rotation axis of the flow constrain element inside of said air valve disposition (10), configured so that engage directly, preferentially by means of removable connection, on the air valve disposition (10).

The invention claimed is:

1. A beverage discharge disposition adapted for frothing a liquid food product and adapted to be provided on the front region of a beverage preparation machine (20), said beverage discharge disposition comprising:

- a discharge casing (1) including a liquid food product circulation disposition (2) that presents an air valve disposition (10) adapted so as to regulate an air flow that is supplied downstream thereof, to a mixture of pressurized vapour flow and said liquid food product, wherein said air valve disposition (10) comprises:
  - an ambient air admission,
  - an air flow constrain element (19) adapted so as to provide variations of passageway section of ambient air flow,
  - an air flux discharge wall (17) provided downstream of said air flow constrain element (19), and
  - a discharge chamber provided upstream of said air flux discharge wall (17),
- whereby said air flux discharge wall (17) presents a single flow passageway (18) with a forma circular form and arranged centred relative to said discharge wall (17), with a characteristic passageway dimension that is at least one order of magnitude smaller than said characteristic dimension of the space downstream thereof,
- so that said air valve disposition (10) regulates the air flow that flows through said air flux discharge wall (17), preferentially through certain previously defined positions according to a liquid food product flux selection means (3) of said liquid food product.

2. The beverage discharge disposition according to claim 1, characterized in that said air flux discharge wall (17) is provided with the form of a disk with a thickness smaller than 3 mm, preferentially smaller than 1.5 mm, preferentially in a food-grade metallic material, and

- in that said air flux discharge wall (17) presents a single flow passageway (18) with a characteristic dimension (d) comprised between 0.18 and 0.30 mm, preferentially between 0.20 and 0.24 mm.

3. The beverage discharge disposition according to claim 1, characterized in that said air flux discharge wall (17) is provided inside of said air valve disposition (10) so as to interact with said upstream flow passageway section constrain element (19) that is driven by said liquid food product flux selection means (3), whereby said flow constrain element (19) is adapted so that provides at least three different flow passageway sections along respective angular segments of the perimeter thereof, corresponding to different previously defined positions of said liquid food product flux selection means (3), thereby providing at least different flow passageway sections of air entry into said air valve disposition (10), whereby said flow constrain element (19) is preferentially further adapted so that when said air valve disposition (10) is at least partially open, the entry air flow impinges said air flux discharge wall (17) mostly on an upper half thereof.

4. The beverage discharge disposition according to claim 1, characterized in that said air flux discharge wall (17) is adapted so that can be retained by means of pressured-fitting inside of a disposition with a general tubular form that presents a degree along the interior perimeter whereupon successively sit a sealing with a general disk-like form and a perimeter region of said air flux discharge wall (17), preferentially by means of removable fitting, so that said air flux discharge wall (17) can be manually removed from said air valve disposition (10), and again mounted thereupon, without the need of using tools.

5. The beverage discharge disposition according to claim 1, characterized in that said air valve disposition (10) is provided in connection of mechanic actuation upstream with said liquid food product flux selection means (3), preferentially by means of said flow constrain element (19) arranged on the same rotation axis and adapted so that engages directly, preferentially by means of removable fitting connection, with said liquid food product flux selection means (3), and

- in that said air valve disposition (10) is provided flow connected downstream, preferentially by means of an elbow connection, with a flow distribution disposition (11) that provides flow connection to a liquid food product flow and a pressurized vapour flow.

6. The beverage discharge disposition according to claim 1, characterized in that said discharge casing (1) is provided so that confines:

- a first fluid discharge line adapted for discharge of a first type of beverage and provided in flow connection with an upstream pressurized flow source, such as for example a pressure pump, and with a downstream first beverage discharge (15);

a second fluid discharge line for discharge of liquid food product and that comprises:
- a first fluid supply adapted for supplying vapour and provided in flow connection upstream with said pressurized fluid source and downstream with a vapour exit nozzle (13),
- a second fluid supply adapted for supplying air and that provides flow connection upstream with an air admission (14) associated with selection means (3) of liquid food product flux that provide regulation of the air flow through an air valve disposition (10), and downstream with a flow distribution disposition (11),
- a third fluid supply adapted for supplying liquid food product and that provides flow connection upstream with a liquid food product supply recipient (6) provided outside of said beverage preparation machine, and downstream with said flow distribution disposition (11),
- whereby said first, second and third fluid supplies, are provided in flow connection downstream, by means of said flow distribution disposition (11), with a second beverage discharge (12), and
- whereby said second and third fluid supplies and respective second fluid discharge (12) are provided so that can be flow connected by means of removable pressure-fitting connection of said flow distribution disposition (11) with said vapour entry connection (7), so that said second and third fluid supplies, flow distribution disposition (11) and second beverage discharge (12) can be jointly removed from connection with said first fluid supply, and
- whereby said vapour outlet nozzle (13) is adapted for pressured-fitting with a vapour entry connection (7) associated with said flow distribution disposition (11), and whereby said connection to the liquid food product supply recipient (6) includes the liquid food product entry connection (4) adapted for pressure-fitting between a connection part of liquid food product supply recipient (6) and a connection part of said discharge casing (1).

7. The beverage discharge disposition according to claim 1, characterized in that said discharge casing (1) presents:
- an attached part associated to the casing of said beverage preparation machine (20) and that presents selection means (5) of beverage type, including a liquid food product option, and a first beverage discharge (15) for discharge of a first beverage type, such as for example coffee;
- a part that is removable from the discharge casing (1) corresponding to a liquid food product circulation disposition (2) providing removable flow connection to an exterior supply recipient (6) to said machine (20), and comprising all components exposed to the liquid food product circulation in said machine (20) including a second beverage discharge (12);
- whereby said liquid food product circulation disposition (2) is provided so that can be manually attached in removable manner on said attached part of discharge casing (1), so that said second beverage discharge (12) results next to said first beverage discharge (15) inside of said discharge casing (1).

8. The beverage discharge disposition according to claim 1, characterized in that said liquid food product circulation disposition (2) is adapted so that can be attached in removable manner to a lateral portion of said attached part of discharge casing (1), by means of displacement in transversal manner relative thereto, preferentially by guiding means (8) provided in opposite regions, and developing along at least part of the extension of said opposite regions of said liquid food product circulation disposition (2), thereby providing establishing and removal of flow connection of said vapour entry connection (7) with said vapour exit nozzle (13) upstream.

9. The beverage discharge disposition according to claim 1, characterized in that said liquid food product circulation disposition (2) presents a first part (9a) adapted so as to provide support to said liquid food product flux selection means (3) and to said liquid food product entry connection (4), and preferentially configured so as to provide an exterior surface that develops in coherent manner in relation to the remanding exterior surface of said discharge casing (1) when said liquid food product circulation disposition (2) is placed in said discharge casing (1), and further presents a second part (9b) adapted so as to provide support to said vapour entry connection (7), whereby said first and second structural parts (9a, 9b) are configured as elements that can be manually pressure-fitted with each other.

10. The beverage discharge disposition according to claim 9, characterized in that said first and second structural parts (9a, 9b) are adapted so that support an air valve disposition (10), a flow distribution disposition (11) and a liquid food product discharge (12), along a general upstream to downstream direction.

11. The beverage discharge disposition according to claim 1, characterized in that said liquid food product circulation disposition (2) comprises a flow distribution disposition (11) adapted so that presents said liquid food product entry connection (4) and said vapour entry connection (7), and that provides flow connection, preferentially by means of pressure fitting, with said air valve disposition (10), and with said second beverage discharge (12), whereby said flow distribution disposition (11) is preferentially retained in exterior walls of said first and second structural parts (9a, 9b).

12. The beverage discharge disposition according to claim 1, characterized in that said milk flux selection means (3) are provided so can be manually actuated between successive positions along an actuation plane that is at least approximately orthogonal relative to the front plane of said discharge casing (1), and in that said liquid food product flux selection means (3) are adapted so that provide a regulation of air flow, in particular by means of said air valve disposition (10), inside of said liquid food product circulation disposition (2), and thereby of the type of liquid food product flow discharged downstream thereof.

13. The beverage discharge disposition according to claim 1, characterized in that said selection means (3) of liquid food product flux are provided so that can be moved along a previously defined path, preferentially around a respective rotation axis, between a plurality of at least two and up to five, preferentially up to three previously defined positions, thereby providing a corresponding variation of the type of discharge flow of said liquid food product to be frothed, whereby at least one position corresponds to a substantially continuous liquid food product flow type and a second position corresponds to a substantially frothed liquid food product flow type.

14. The beverage discharge disposition according to claim 1, characterized in that said liquid food product flux selection means (3) are adapted so as to apprehend the relative position of said manual regulation means and to provide respective information to at least one of one control unit of said beverage preparation machine and state display means.

15. A beverage preparation machine (20) for preparing beverages from an edible substance comprising a beverage discharge disposition according to claim 1,
   wherein said beverage preparation machine is adapted to provide discharge of a first type of aromatic beverage and of a second beverage type frothed by means of pressurized vapour.

\* \* \* \* \*